United States Patent Office 3,712,916
Patented Jan. 23, 1973

3,712,916
PREPARATION OF HYDROXYL TERMINATED POLYMERS
Alan R. Siebert, Maple Heights, Ohio, assignor to The B. F. Goodrich Company, New York, N.Y.
No Drawing. Original application May 22, 1968, Ser. No. 731,281, now Patent No. 3,551,471. Divided and this application July 2, 1970, Ser. No. 52,125
Int. Cl. C07c 69/66
U.S. Cl. 260—484 R    3 Claims

ABSTRACT OF THE DISCLOSURE

Hydroxyl terminated polymers, useful as adhesives and caulking materials are prepared by the reaction of carboxyl terminated polymers with ethylene oxide in the presence of a tertiary amine catalyst.

CROSS REFERENCE TO RELATED APPLICATION

This application is a division of copending application Ser. No. 731,281, now U.S. Pat. 3,551,471, filed May 22, 1968 by A. R. Siebert.

BACKGROUND OF THE INVENTION

Hydroxyl terminated liquid olefinic polymers are useful as crosslinking agents with difunctional polymers, as adhesives, and as caulking and potting compounds. They cure readily through reaction of the terminal hydroxyl groups with organic diisocyanates to form solid high molecular weight materials of low fusibility.

These liquid polymers may be hydroxyl terminated homopolymers such as polybutadiene and highly saturated polymers such as polyalkyl acrcylates whose alkyl moieties consist of 1-8 carbon atoms.

Hydroxyl functional polymers can presently be produced from olefinic polymers by first converting a portion of the olefinic bonds of the polymer to ozonide linkages, and then reductively cleaving the ozonide linkages to produce hydroxy terminated polymer.

Alternative processes of manufacture are desirable and constantly being sought in the art. Furthermore, polymers prepared by cleavage of higher molecular weight chains as described above generally do not achieve hydroxyl functionality at each end of the polymer chains, that is, the final hydroxyl functionality is generally considerably less than 2, often 1.6 to 1.8. For most efficient use of the reactants and the obtainment of best overall properties it is desirable to have final hydroxyl functionality as close to 2.0 as possible.

SUMMARY OF THE INVENTION

Carboxyl terminated polymers of polybutadiene and polyalkyl acrylates are known in the art. It has now been discovered that it is possible to convert these carboxyl terminated liquid polymers to hydroxyl terminated liquid polymers wtih a high degree of difunctionality, i.e. practically 2, indicative of the fact that an hydroxyl group is located at each end of the polymer chain. The property of difunctionality is essential if higher polymers are to be produced by the subsequent curing reactions. This conversion is accomplished by reaction of liquid carboxyl terminated polymer with 3 to 10 parts per hundred of polymer of ethylene oxide in the presence of 0.1 to 0.3 part of tertiary amine catalyst. The reaction medium may be any solvent that will dissolve the carboxyl terminated polymers, and the hydroxyl terminated polymer which is formed. Acetone, tertiary butanol, methyl ethyl ketone, cyclohexanone, cyclohexanol, tetrahydrofuran and dioxane are typical solvents that may be used.

Optionally the addition reaction may be run in a mass or bulk system with no solvent medium being employed. In such cases the ethylene oxide is preferably employed in excess to insure fluidity and accomplish satisfactory heat transfer.

Carboxyl terminated polymers of butadiene and polyalkyl acrylate can be produced by the process taught in United States Pat. 3,285,949. Preferably the desired monomers are placed in a solvent with a low chain transfer potential, preferably tertiary butanol, and a bis-azocyano acid initiator, preferably azodicyanovaleric acid is added. Polymerizations are run at 70°–80° C. Product polymer is thrown down with methanol and separated by decantation. These carboxyl terminated polymers are curable with diisocyanates. It has been discovered that when the liquid carboxyl terminated polymers are reacted with ethylene oxide, the chain terminal groups are opened up and converted from carboxyl to hydroxyl.

Carboxyl terminated polymers are used as adhesives and caulking compounds, but they do not cure completely satisfactorily with epoxy resins. Trifunctional aziridinyl compounds are currently used to cure products using carboxyl terminated adhesives or binders. These systems unfortunately have low elongations and they age poorly. A more desirable curing reaction is that between a terminal hydroxyl group and a diisocyanate. No undesirable products are formed and high adhesive strengths are attained. Catalysts that may be employed for the conversion of carboxyl terminated polymer to hydroxyl terminated polymer include primary, secondary and tertiary, mono and polyamines. Particularly preferred are trimethyl amine, triethyl amine, tributyl amine, triisoamyl amine and the like. Catalyst is employed in the range of 0.1 to 0.3 part per hundred parts of liquid carboxyl terminated polymer.

Molecular weights of the polymers are determined with a Mechrolab Vapor Pressure Osmometer using methyl ethyl ketone (MEK) or toluene as the solvent. The instrument is calibrated with azobenzene and sucrose octaacetate. Molecular weight may also be calculated from the chemical equivalents per hundred of rubber of carboxyl (ephr.) value determined by titration of polymer solution with alcoholic KOH to a phenolphthalein endpoint. Functionality of the polymer is defined as the ratio of the osmometer molecular weight (corrected for antioxidant, if any is present) to the calculated ephr. molecular weight times 2, the ideal number of functional groups per molecule.

Brookfield viscosity, employing an LVT model viscometer and a #4 spindle is run on the freshly prepared polymers. Values up to 50,000–80,000 cps. are accepted by the art as indicative of pourable, easily handled materials.

DETAILED DESCRIPTION OF THE INVENTION

Example 1

A bottle polymerization of butadiene in tertiary butanol is conducted using azodicyanovaleric acid catalyst. When the catalyst is about 75% decomposed, the excess butadiene is vented and the bottle contents are added to methanol with stirring to throw down the liquid polymer. After settling, the methanol-teritary butanol layer is decanted. One part phenylbetanaphthylamine antioxidant is added to the polymer per 100 parts of polymer which is then dried in a Rinco evaporator to constant weight.

TABLE 1

| | |
|---|---:|
| Tertiary butanol _____ parts__ | 100 |
| Butadiene _____ do____ | 100 |
| Azodicyanovaleric acid _____ do____ | 4 |
| Temperature _____ ° C__ | 70 |
| Polymerization time _____ hrs__ | 16 |
| Polymer yield _____ g__ | 16.5 |
| COOH/ephr. (equivalent per hundred parts rubber) | .0515 |
| Brookfield viscosity at 27° C. _____ cps__ | 49,000 |
| $\overline{M}n$—MEK | 3840 |
| $\overline{M}n$—calc. | 1.98 |
| Functionality | 1.98 |

100 parts of the carboxyl terminated polymer are added with 100 parts acetone to a quart glass polymerization bottle. The bottle is flushed with nitrogen, capped with a puncture sealing cap and placed in a 90°–95° C. bath until polymer is completely dissolved. After the polymer solution is cooled to about 25° C., varying parts of ethylene oxide and trimethyl amine are injected through the sealing cap. The esterification is conducted to completion in the 90°–95° C. bath. Reaction is followed by titrating an aliquot from the bottle with standard base using phenolphthalein indicator. The hydroxyl terminated polymer is recovered by drying the solution on a Rinco evaporator to remove acetone and excess ethylene oxide and drying for 30 minutes at 90° C. with a pressure below 2 mm.

The following data is observed on the hydroxyl terminated polybutadiene:

TABLE 2

| | A | B |
|---|---|---|
| Carboxyl terminated polybutadiene | 100 | 100 |
| Acetone | 100 | 100 |
| Trimethylamine | 0.1 | 0.1 |
| Ethylene oxide | 5 | 6 |
| Final COOH/EPHR | .0023 | .0008 |
| Viscosity-Brookfield at 27° C | | |
| Hydroxyl polymer | 59,000 | 59,000 |
| OH/ephr. | .0435 | .0516 |
| $\overline{M}n$ | 4420 | 3790 |
| OH functionality | 1.93 | 1.95 |
| Total functionality (carboxyl plus hydroxyl) | 2.02 | 1.99 |

EXAMPLE 2

The procedure of Example 1 is repeated with different tertiary amine catalysts and occasionally with an antioxidant, 2,2'-methylenebis(4-methyl-6-t-butylphenol) added to the carboxyl terminated polymer.

100 m. parts of hydroxyl terminated polymer are mixed in an aluminum pan with 4 m. parts toluene diisocyanate at a ratio of one equivalent of hydroxyl to one equivalent of isocyanate curing agent. Pot life is measured by lifting the mixture on a spatula at intervals. When it has become too viscous to spread, the pot life time is recorded.

TABLE 3

| | C | D | E | F | G |
|---|---|---|---|---|---|
| Carboxyl terminated polybutadiene | 100 | 100 | 100 | 100 | 100 |
| Antioxidant at 1.25 phr | No | No | Yes | Yes | Yes |
| Acetone | 100 | 100 | 100 | 100 | 100 |
| Trimethylamine | .11 | .08 | .1 | .1 | |
| Triisoamylamine | | | | | .38 |
| Ethylene oxide | 4 | 4 | 4 | 4 | 4 |
| Pot life with 1.0 equivalent of toluene diisocyanate | ¹30 | ¹60 | ¹10 | ²>2 | ²>2 |

¹ Minutes.  ² Hours.

A pot life of greater than 2 hours is desirable for most applications of adhesives. For occasions where faster pot life, say ½ hour up to two hours, is desired, these materials meet the qualification.

EXAMPLE 3

A carboxyl terminated polybutyl acrylate is prepared in acetone by adding monomers and solvent to an evacuated and nitrogen purged polymerization vessel under nitrogen pressure. Polymerization runs 4 hours at 90° C. and the product polymer is thrown down with methanol and recovered by decantation.

TABLE 4

| Material: | Parts |
|---|---:|
| N-butyl acrylate | 97 |
| Butadiene | 3 |
| Acrylic acid | 0.4 |
| Azodicyanovaleric acid | 12 |
| COOH/ephr. | .102 |
| Brookfield viscosity at 27° C. cps. | 70,000 |

The liquid carboxyl terminated polybutyl acrylate is reacted with ethylene oxide in presence of triisoamyl amine by the process set forth in Example 1 to produce hydroxyl terminated polybutyl acrylate.

TABLE 5

| | |
|---|---:|
| Carboxyl terminated polybutyl acrylate | 100 |
| Ethylene oxide | 5 |
| Triisooamylamine _____ g__ | .8 |
| COOH/ephr. | .003 |
| Brookfield viscosity at 27° C. cps. | 41,500 |
| Pot life with 1.0 equivalent of toluene diisocyanate _____ hrs__ | >2 |

When fully cured, usually in less than 24 hours, the products of this invention are dry to the touch and elastomeric in nature. They can be dented by pressure, as by a finger nail, but will resume their shape when the pressure is released.

What is claimed is:

1. Liquid hydroxyl terminated polymers selected from the class consisting of polybutadiene and polyalkyl acrylates whose alkyl moiety consists of 1–8 carbon atoms said polymers being prepared by the reaction of liquid carboxyl terminated polymers selected from the class consisting of carboxyl terminated polybutadiene and carboxyl polyalkyl acrylates whose alkyl moiety consists of 1–8 carbon atoms, said carboxyl terminated polymers being prepared by the reaction of butadiene and monomeric alkyl acrylates in tertiary butanol at 70°–80° C. in the presence of a bis-azocyano acid with 3–10 parts per 100 parts of liquid carboxyl terminated polymer of ethylene oxide in the presence of 0.1 to 0.3 part per hundred parts of liquid carboxyl terminated polymer of an amine catalyst selected from the group consisting of trimethyl amine, triethyl amine, tributyl amine and triisoamyl amine in a reaction medium selected from the group consisting of acetone, tertiary butanol, methyl ethyl ketone, cyclohexanol, tetrahydrofuran and dioxane, said reaction medium being maintained at about 90°–95° C.

2. The liquid hydroxyl terminated polymers of claim 1 where the liquid carboxyl terminated polymer is polybutadiene.

3. The liquid hydroxyl terminated polymers of claim 1 where the liquid carboxyl terminated polymers is polybutyl acrylate.

References Cited

UNITED STATES PATENTS 3,360,545   12/1967   Wygant _____ 260—485

HENRY R. JILES, Primary Examiner

P. J. KILLOS, Assistant Examiner

U.S. Cl. X.R.

260—486 R

UNITED STATES PATENT OFFICE
CERTIFICATE OF CORRECTION

Patent No. 3,712,916    Dated January 23, 1973

Inventor(s)   Alan R. Siebert

It is certified that error appears in the above-identified patent and that said Letters Patent are hereby corrected as shown below:

Column 1, line 35, change "acrcylates" to read ---acrylates---; column 1, line 58, change "wtih" to read ---with---; column 3, line 2, change "teritary" to read ---tertiary---; column 3, line 18 of Table 1, "1.98" should read ---3880---; column 3, line 47 of Table 2, under section B, "1.95" should read ---1.96---.

Signed and sealed this 13th day of November 1973.

(SEAL)
Attest:

EDWARD M. FLETCHER, JR.            RENE D. TEGTMEYER
Attesting Officer                  Acting Commissioner of Patents